(12) United States Patent
Martin et al.

(10) Patent No.: US 8,059,800 B1
(45) Date of Patent: Nov. 15, 2011

(54) METHOD FOR VIRAL DISTRIBUTION OF RINGBACK MEDIA

(75) Inventors: Geoff S. Martin, Overland Park, KS (US); Jay S. Harmon, Overland Park, KS (US); Boaquan Zhang, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1226 days.

(21) Appl. No.: 11/583,396

(22) Filed: Oct. 17, 2006

(51) Int. Cl.
*H04M 15/00* (2006.01)

(52) U.S. Cl. .......... 379/114.01; 379/201.01; 379/207.08; 379/207.16; 379/142.01; 455/414.1; 455/418; 455/567

(58) Field of Classification Search .............. 379/88.19, 379/142.01, 207.16, 350, 201.01, 207.08, 379/114.01; 455/414.1, 418, 567
See application file for complete search history.

(56) References Cited

U.S. PATENT DOCUMENTS

| | | | |
|---|---|---|---|
| 5,774,664 | A | 6/1998 | Hidary et al. |
| 5,887,254 | A | 3/1999 | Halonen |
| 6,009,150 | A | 12/1999 | Kamel |
| 6,018,768 | A | 1/2000 | Ullman et al. |
| 6,330,595 | B1 | 12/2001 | Ullman et al. |
| 6,791,579 | B2 | 9/2004 | Markel |
| 7,006,608 | B2 | 2/2006 | Seelig et al. |
| 7,155,207 | B2 | 12/2006 | Chapman et al. |
| 7,187,761 | B2 | 3/2007 | Bookstaff |
| 7,512,421 | B2 | 3/2009 | Kim et al. |
| 7,523,507 | B2 | 4/2009 | Leinonen et al. |
| 7,613,287 | B1 | 11/2009 | Stifelman et al. |
| 7,685,070 | B2 | 3/2010 | Abu-Amara et al. |
| 2002/0024957 | A1 | 2/2002 | Azuma et al. |
| 2002/0067730 | A1 | 6/2002 | Hinderks et al. |
| 2002/0183048 | A1 | 12/2002 | Takeuchi |
| 2003/0002657 | A1 | 1/2003 | Seelig et al. |
| 2003/0086558 | A1 | 5/2003 | Seelig et al. |
| 2004/0001518 | A1 | 1/2004 | Gilbert et al. |
| 2004/0003102 | A1 | 1/2004 | Du Vall et al. |

(Continued)

FOREIGN PATENT DOCUMENTS

WO    2007073835    7/2007

(Continued)

OTHER PUBLICATIONS

Unpublished U.S. Appl. No. 11/542,713 entitled "Method for Triggering Content Download During Call Setup" filed Oct. 4, 2006 in the name of Geoff S. Martin et al.

(Continued)

*Primary Examiner* — Melur Ramakrishnaiah
*Assistant Examiner* — Yosef K Laekemariam

(57) ABSTRACT

A method for the viral distribution of ringback media. A trigger is transmitted from a calling client station to a ringback server during the ringback period of call setup, whereby in response to receipt of the trigger by the ringback server, the subscriber associated with the calling client station is granted the right to the particular ringback media played out during the ringback period. Upon receiving the trigger, the ringback server may request that an indication that the right has been granted be stored in the subscriber's account record. Subsequent to the granting of the right to the particular ringback media to the subscriber, callers to the subscriber may be presented with the particular ringback. Further, these callers may also request to acquire the right to the particular media via the same trigger-initiated process.

17 Claims, 6 Drawing Sheets

U.S. PATENT DOCUMENTS

| | | |
|---|---|---|
| 2004/0081304 A1 | 4/2004 | Lee |
| 2004/0184595 A1 | 9/2004 | Urata et al. |
| 2004/0221304 A1 | 11/2004 | Sparrell et al. |
| 2005/0105706 A1 | 5/2005 | Kokkinen |
| 2005/0129029 A1 | 6/2005 | Creamer et al. |
| 2005/0137958 A1 | 6/2005 | Huber et al. |
| 2005/0152345 A1 | 7/2005 | Bog et al. |
| 2005/0185918 A1 | 8/2005 | Lowe |
| 2005/0277403 A1 | 12/2005 | Schmidt et al. |
| 2006/0135232 A1 | 6/2006 | Willis |
| 2006/0147014 A1 | 7/2006 | Smith et al. |
| 2006/0147021 A1 | 7/2006 | Batni et al. |
| 2006/0165104 A1 | 7/2006 | Kaye |
| 2006/0212347 A1 | 9/2006 | Fang et al. |
| 2006/0285532 A1 | 12/2006 | Radziewicz et al. |
| 2006/0294571 A1 | 12/2006 | Moore et al. |
| 2007/0038513 A1 | 2/2007 | Flax et al. |
| 2007/0055985 A1 | 3/2007 | Schiller et al. |
| 2007/0061229 A1 | 3/2007 | Ramer et al. |
| 2007/0100690 A1 | 5/2007 | Hopkins |
| 2007/0121916 A1 | 5/2007 | Wang et al. |
| 2007/0127705 A1 | 6/2007 | Wang |
| 2007/0168462 A1 | 7/2007 | Grossberg et al. |
| 2007/0168884 A1 | 7/2007 | Weeks et al. |
| 2007/0174230 A1 | 7/2007 | Martin |
| 2007/0189497 A1 | 8/2007 | Bareis |
| 2007/0192468 A1 | 8/2007 | Keeler |
| 2007/0201484 A1 | 8/2007 | Kenrick et al. |
| 2007/0211872 A1 * | 9/2007 | Cai et al. .................. 379/142.01 |
| 2007/0250901 A1 | 10/2007 | McIntire et al. |
| 2007/0276726 A1 | 11/2007 | DiMatteo |
| 2007/0286402 A1 | 12/2007 | Jacobson |
| 2008/0075236 A1 | 3/2008 | Raju et al. |
| 2008/0168512 A1 | 7/2008 | Nguyen |
| 2008/0212749 A1 | 9/2008 | Huang |
| 2009/0037949 A1 | 2/2009 | Birch |
| 2009/0055857 A1 | 2/2009 | Gatz |
| 2009/0185669 A1 | 7/2009 | Zitnik et al. |
| 2010/0296635 A1 | 11/2010 | Bobst |

FOREIGN PATENT DOCUMENTS

| | | |
|---|---|---|
| WO | 2007090173 | 8/2007 |

OTHER PUBLICATIONS

Unpublished U.S. Appl. No. 11/603,615 entitled "Multi-call Ringback Reward Method" filed Nov. 22, 2006 in the name of Robert H. Burcham.
Unpublished U.S. Appl. No. 11/747,716 entitled "Method of Informing a Called Party Which Ringback Tone is Being Played to a Caller During Call Setup" filed May 11, 2007 in the name of Geoff S. Martin et al.
Unpublished U.S. Appl. No. 11/927,122 entitled "Method for Offering Content Download During Streaming Media Sessions" filed Oct. 29, 2007 in the name of Jay S. Harmon et al.
Office Action in U.S. Appl. No. 11/542,713 mailed May 14, 2010.
Office Action in U.S. Appl. No. 11/927,122 mailed Mar. 4, 2010.
Office Action in U.S. Appl. No. 11/603,615 mailed Aug. 4, 2010.
Office Action in U.S. Appl. No. 11/542,713 mailed Aug. 24, 2010.
Office Action in U.S. Appl. No. 11/542,713 mailed Nov. 17, 2010.
Rahul Chauhan "A Walk Through to IS-95A, IS-95B, CDMA-2000 and Call Processing", Version 2 (Jun. 20, 2003).
G. Camarillo et al., "Early Media and Ringback Tone Generation in the Session Initiation Protocol", IETF Internet Draft (Feb. 10, 2003).
Unpublished U.S. Appl. No. 11/378,442 entitled "Dynamic Provisioning of a Switch With Custom Ringback Media" filed Mar. 16, 2006 in the name of Boaquan Zhang et al.
Office Action in U.S. Appl. No. 11/542,713 mailed Jan. 28, 2011.
Office Action in U.S. Appl. No. 11/603,615 mailed Jan. 19, 2011.
Office Action in U.S. Appl. No. 11/747,716 mailed Apr. 12, 2011.
Office Action in U.S. Appl. No. 11/603,615 mailed Apr. 13, 2011.
Office Action in U.S. Appl. No. 11/542,713 mailed Apr. 1, 2011.

* cited by examiner

METHOD FOR VIRAL DISTRIBUTION OF RINGBACK MEDIA

FIELD OF THE INVENTION

The present invention relates to telecommunications and, more particularly, to distributing ringback media to subscribers.

BACKGROUND

In a traditional telephone network, ringback is typically an audible tone sequence presented during call setup to a caller to signal that the called party's phone is being alerted of the caller's incoming call to the called party. Upon hearing ringback, the caller may generally assume that the called party is receiving a corresponding, concurrent (or nearly concurrent) alert, such as an audible ringtone sequence. The ringback usually continues until either the called party (or a call-handling function, such an answering machine) answers the call or the caller hangs up before the call is answered. The time within the call setup during which ringback is played is typically referred to as the ringback period.

The model for ringback has evolved similarly in both circuit-switched telephony with out-of-band signaling and services (Signaling System 7 (SS7) and Advanced Intelligent Network (AIN), for example), and packet-based telephony, such as Voice over Internet Protocol (VoIP). Ringback tone in these types of systems is typically stored as an audio data file on a network entity, such as a network server, and played out to a caller's phone during call setup when the entity receives a signal, from a terminating switch for example, indicating that the called party's phone is being alerted.

The server-based model of ringback tone storage/playout can support multiple ringback tones, and lends itself to a variety of schemes for customization of ringback tones. An example of customization of ringback tone is a user feature that allows a subscriber in a carrier or service provider network to select one or more ringback tones that will be presented to callers to that user. The carrier or service provider may in turn charge a fee to the subscriber for access to the feature.

SUMMARY

The advent of intelligent client stations in VoIP networks and the continued increase in memory and processing power of cellular phones, together with carriers' drive to develop new revenue streams, have helped spawn new, interactive telecommunication services and features, including customized ringback. However, the potential of ringback tones as the basis for new and/or expanded services beyond just customization has not yet been fully tapped, and consequently, carriers have an interest in developing methods and systems that integrate customized ringback with new services and features that bring value to their subscribers and revenue to their business.

Accordingly, the present invention is directed to a method and system for coupling customized ringback with the ability of subscribers in a service provider network to instantly and automatically adopt as their own the ringback media that they receive when placing calls to other subscribers. More particularly, a method and system is disclosed for transmitting a trigger signal from a calling client station (with capabilities described below) to a network ringback server during the ringback period of call setup, whereby the trigger signal, once received and recognized by the ringback server, results in the acquisition by the subscriber associated with the calling client station of the right to use the particular ringback media played out during the ringback period of the call setup. Thereafter, the particular ringback media may be played out to callers to the subscriber during ringback periods of their calls to the subscriber. Further, callers who are themselves subscribers in the service provider network will have the ability (through their client stations) to similarly request and acquire the particular ringback media. In this manner, ringback media content may become virally distributed among a service provider's subscribers. The service provider may in turn charge a fee for the service, for example each time a subscriber requests and acquires the right to a new ringback tone (or other form of ringback media).

In a preferred embodiment, subscribers may instantly and automatically acquire as their own the right to the ringback media that is presented to them when they place calls to other subscribers. By charging subscribers a fee for each right acquired, the service provider may in turn generate revenue on a per-rights-acquisition basis. At the same time the ability to obtain new ringback media simply by placing a call creates an incentive for subscribers to place calls, and thereby tends to increase call-volume-related revenue for the service provider. By combining the incentive to use the service with the automatic invocation of its operation, the sharing of ringback media among subscribers propagates in a viral manner.

Hence, in one respect, the invention is directed to method and system for virally distributing ringback media by receiving a trigger sent from a calling client station during the ringback period for a call, and responsively granting to the subscriber associated with the calling client station the right to the ringback media played out during the ringback period. A subscriber's right to a ringback media corresponds to a right to have the ringback media played out to callers to the subscriber during the ringback period of call setup. The right to the ringback media preferably is granted by updating a subscriber account record with an indication of the right, and the subscriber may be charged a fee by the service provider upon acquisition of the right. Note that a subscriber may acquire the rights to more than one ringback media (with a possible fee associated with each right), and may further arrange to have the particular ringback media that is played out conditioned on the identity of the caller, including the possibility of not playing out customized ringback media to some or all callers (i.e., playout instead of the service provider's default ringback media, for instance). Thus different callers to the subscriber may be presented with different ringback media. Throughout the present disclosure, the action of playing out ringback media to which a subscriber has acquired the right is generally depicted as occurring on all calls to that subscriber. This depiction is used because exemplary calls in which playout does occur embodies certain operational aspects of the present invention, hence only these exemplary calls are considered herein. However, it should be understood that not all callers to a given subscriber who has acquired rights to one or more customized ringback media will necessarily be presented with any of those customized ringback media, nor does the present invention require playout of customized ringback media on each and every call to a subscriber who has acquired a corresponding right.

In operation, the trigger may be received by a ringback server that plays the ringback media presented to the client station of a calling subscriber during call setup. Preferably, the trigger comprises one or more tones dialed by the calling subscriber, for example dual-tone multi-frequency (DTMF) digits, as an indication that the calling subscriber desires to acquire the right to the ringback media. Other forms of signaling are also possible. In further accordance with the preferred embodiment, the ringback media is played out to the calling subscriber within a ringback session that is set up between the calling client station and the ringback server, possibly by way of one or more switches or other network transport/routing elements. In such a configuration, the trigger may be transmitted as a signal or message that traverses the one or more switches between the calling client station and the ringback server. That is, the trigger from the calling client station may first be received by a switch, and then relayed by the switch to the ringback server.

Once the calling subscriber acquires the right to a particular ringback media as described above, a caller to that subscriber may then be presented with the particular ringback media associated with the acquired right. Moreover, the caller to the subscriber may similarly acquire the right to the particular ringback media, according to the same basic procedure. In accordance with the preferred embodiment, the caller's client station will transmit a trigger to the ringback server and responsively receive the right to the particular ringback media, just as the original calling subscriber did on one or more previously placed calls. As this process repeats through subsequent rounds of calling, triggering, and rights-granting, various ringback media become distributed virally among subscribers.

In another respect, the invention is directed to a method and system for the viral distribution of ringback media in which account records of subscribers in a service provider network are used to store indications of ringback media to which the subscribers have rights. As explained above, a subscriber's right to a ringback media corresponds to a right to have the ringback media played out to callers to the subscriber during the ringback period of call setup. In operation, the ringback server will store multiple selections of ringback media, for example in various files and file formats, and during the setup of a call to a given subscriber will play out to the calling party a particular selection according to the right to the selection as indicated in the given subscriber's account record. If it happens that the calling party is also a subscriber in the service provider network, then a trigger may be received from the calling party during the ringback period of the call setup (i.e., during the playout of the ringback media to the calling subscriber), and the calling party's account record may in turn be updated, responsive to receipt of the trigger, with an indication that the calling party has newly acquired the right to the particular ringback media. Thereafter, callers to the subscriber (previously the calling party) with the newly acquired right may have the particular ringback media played out to them.

Subscriber account records preferably support subscriber customization of ringback media by allowing subscribers to request rights to one or more specific ringback media. A subscriber may further request that the ringback media played out on any given call be determined according to the identity of the caller, so that different callers to the subscriber may be presented with different ringback media, for example. In accordance with the preferred embodiment, a subscriber's request for the right to a particular ringback media, as well as possibly making selection of ringback media caller-identity-based, will be accommodated by storing an indication in the subscriber's account record. Upon any given call to the subscriber, the subscriber's account record will be used to determine, according the stored indication, which ringback media should be played out by the ringback server to the caller.

A subscriber's request for customization of ringback media, including the specific ringback media selection and conditions under which to play it out, may be conveyed in a trigger from the subscriber's client station during a call setup of a call placed by the subscriber, as described above. Preferably, the service provider will also provide other means for subscribers to customize their ringback media. For example, a web-based user interface may be provided that allows a subscriber to customize his or her ringback media from a personal computer, or the like. In this case, the request may be conveyed in the context of a secure web-based session, for example, and used to update the subscriber's account record with the corresponding indication of the ringback media to be played out to callers to the subscriber. Other examples are possible as well.

The service provider may adopt one or more fee structures for the service of ringback media customization. For instance, the service provider may charge a subscription fee for general customization, e.g., via a web account, as well as a per-use fee for the trigger-based method invoked during the ringback period of calls placed by subscribers. Thus, in accordance with the preferred embodiment, when a calling subscriber acquires the right to the ringback media of a called subscriber via the trigger-invoked procedure described above, the calling subscriber may be charged a fee by the service provider for that right.

In further accordance with the present embodiment, on calls to subscribers, ringback media will be played out to the calling party by first establishing a ringback session between the ringback server and the calling party. The session may then be used to transmit the ringback media from the ringback server to the calling party's client station during the ringback period of the call placed by the calling party. For example, if the call is a circuit-based call, the session may include a bearer channel to carry the media, and be established using SS7 signaling. Alternatively, if the call is a VoIP call, the session may include packet-media transport, such as a Real-time Transport Protocol (RTP) stream, and be established using Session Initiation Protocol (SIP) signaling. Further, if the calling party is also a subscriber in the service provider network and wishes to invoke trigger-based acquisition of the ringback media, then the trigger may be received by the ringback server in the same ringback session.

In practice, the ringback session between the calling subscriber and the ringback server may pass through one or more network switching elements. Consequently, the trigger from the calling subscriber may first be received by a switch, and then received by the ringback server after being forwarded in a transmission from the switch. Further, the trigger itself may take various forms. For example, as noted above the trigger could be received by the ringback server in the form DTMF tones, e.g., comprising a feature code dialed by the calling subscriber. Alternatively, the trigger could be transmitted via short message service (SMS) from the calling subscriber. As another example, the trigger could be transmitted via a SIP message, such as a SIP NOTIFICATION message for VoIP calls. Other forms of triggers and trigger transmission are possible as well. In each case, the trigger is preferably received by the ringback server.

Through the repeated invocations of the trigger-based subscriber request for customized ringback media selection, each carried out as described above, various specific ringback media may become distributed in a viral-like manner among subscribers. In accordance with the preferred embodiment, a caller to a subscriber who has acquired the right to a particular ringback media will hear the particular ringback media during the ringback period. As described, if the caller is also a subscriber, then that caller may similarly acquire the right to the particular ringback media. In fact all callers to the subscriber who are themselves subscribers may acquire the right to the particular ringback media. Thereafter, callers to these subscribers may also acquire the rights to the particular ringback media, if those callers, too, are subscribers. As the process repeats, the rights to various ringback media are acquired by more and more subscribers. For each new acquisition, the account record of the subscriber who acquires the right is updated with a corresponding indication of the right. Further, upon every new acquisition of a right to ringback media, the service provider may charge a fee to the subscriber to whom the right is granted.

Prior to the advent of customized ringback, ringback media were generally limited to simple audible tones, referred to according the customary term "ringback tone." In keeping with the customary terminology, the term "ringback tone" is also used throughout the present disclosure. While this usage implies a simple, audible form for ringback, in all of the exemplary embodiments described herein, it should be understood that other forms of ringback media may be possible, such as video and complex audio forms, including music, for example. Thus, the term "ringback tone" is used herein synonymously with "ringback media," and is intended to apply to any and all forms of ringback media that may be presented to and played or displayed upon a calling client station.

In further accordance with the preferred embodiment, the calling client station will incorporate software and/or hardware capable of carrying out the various client-side aspects of the present invention. Specific client-side capabilities may include, without limitation, DTMF tone detection and generation, generation and transmission of the trigger, and executable instructions for carrying out the functions described herein. These and possibly other client-side capabilities may be implemented on the calling client station in software, firmware, and/or hardware. Note also that the calling client station could be any one of a number of possible devices, such as a wireless cellular device capable of both circuit-based and packet-data-based communications with a provider network, a wireless local area network device, such as a hand-held computer or VoIP phone, a wired VoIP phone, or other type of communication station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Figure 1:
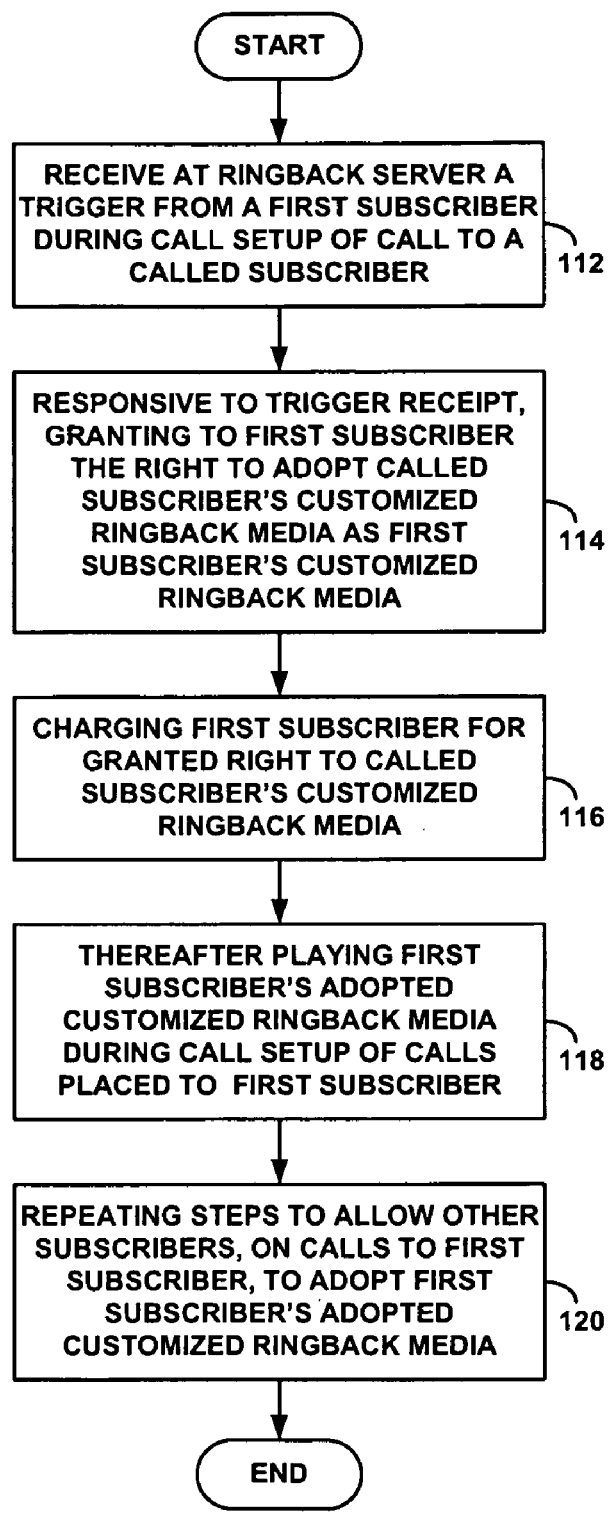
FIG. 1 is an exemplary flowchart of the method representing a process by which viral distribution of ringback media can be carried out.

An exemplary embodiment of the present invention is illustrated in the form of a flowchart in FIG. 1. At step 112, a ringback server receives a request from a first subscriber in a service provider network during the ringback period of a call placed by the first subscriber to a called subscriber. The trigger may be sent by the first subscriber's client station in response to input by the first subscriber, for example. Preferably, the trigger is transmitted to the ringback server using a ringback session that was previously established between the ringback server and the calling client station for the purpose of playing out ringback media to the calling client station. Alternatively, the trigger may be transmitted from the calling client station to the ringback server using some form of out-of-band signaling, such as an SMS message for a circuit-cellular call, or a SIP message for a VoIP call. Other forms of trigger transmission are possible as well.

At step 114, the ringback server, responsive to receiving the trigger, recognizes the trigger as a request from the first subscriber to acquire the right to the ringback media of the called subscriber. In further response to receiving the trigger, the first subscriber is granted the right to the called subscriber's ringback media. As described above, a subscriber's right to a ringback media corresponds to a right to have the ringback media played out to callers to the subscriber during the ringback period of call setup. Preferably, the right is granted by storing in the first subscriber's account record an indication of the right.

In practice, the ringback server may communicate with another network entity that maintains and manages subscriber account records, such as a subscriber accounts database, for example. More specifically, the ringback server, responsive to receiving the trigger from the first subscriber, will preferably identify both the first subscriber (i.e., some form of identification) and the particular ringback media to which the right is being requested. For example, if the trigger is received via a ringback session between the ringback server and the first subscriber's client station, established for the purpose of playing out the ringback media of the called subscriber, then both the first subscriber and the particular ringback media in question may be identified by the ringback server according to session identification. Alternatively, if the trigger is transmitted as (or in) an out-of-band message, then the trigger itself may contain information that identifies the first subscriber and the particular ringback media in question. Once the ringback server has identified the first subscriber and the particular ringback media, the ringback server may then send a message to a subscriber accounts database requesting that the first subscriber be granted the right to the ringback media. The subscriber accounts database may then update the first subscriber's account record with an indication that the right has been granted.

At step 116, the first subscriber is charged a fee for the granted right to the called subscriber's ringback media. Preferably, this is accomplished in association with the update to the first subscriber's account record carried out in step 114. However, the fee could be assessed at a different time than the subscriber account record update that establishes the right to the ringback media, and possibly by a different network entity than the subscriber accounts database. For example, a billing system may be notified at the time that the right is added to the subscriber account record. Other arrangements are possible as well.

Once the first subscriber has acquired the right to the ringback media of the called subscriber, the first subscriber's acquired ringback media may be played out to callers to the first subscriber, as indicated at step 118. In exemplary operation, when a call to the first subscriber is placed, a call-serving entity, such as a switch, will communicate with the subscriber accounts database in order to determine how calls to the first subscriber should be handled. For example, actions may be conditioned on the identity of the caller, or a call-forwarding function may be turned on. These and/or other call-handling preferences and/or instructions may be recorded in subscriber account records. As described above, an indication of the right to particular ringback media will also be stored in subscriber account records. Thus the call-serving entity will preferably learn from its communication with the subscriber accounts database the particular ringback media that should be played on calls to the first subscriber.

The call-serving entity will then proceed to facilitate routing the call to the first subscriber, and in doing so will act to establish a ringback session between the ringback server and the calling party for the purpose of playing out ringback media to the calling party. In accordance with the exemplary operation, the call-serving entity will provide the ringback server with information that identifies the particular ringback media to play out to the calling party via the ringback session. Thus at step 118, the ringback media played out on calls to the first subscriber is the ringback media acquired according to steps 112-116 of FIG. 1.

Finally, as indicated at step 120, the entire process may be repeated for those callers to the first subscriber who are themselves subscribers in the service provider network. In other words, step 120 introduces a repetitive aspect of the preceding steps that leads to the viral distribution of ringback media among subscribers.

It should be understood that the steps depicted in FIG. 1 are merely, and that other embodiments are possible. In addition, the details described above in connection with the steps are exemplary, and represent only a selection of possible elaborations of the embodiment. Furthermore, the details could be explicitly included in additional steps, and the ordering of certain steps could be modified.

Network Architecture and Client Station Access

Figure 2:
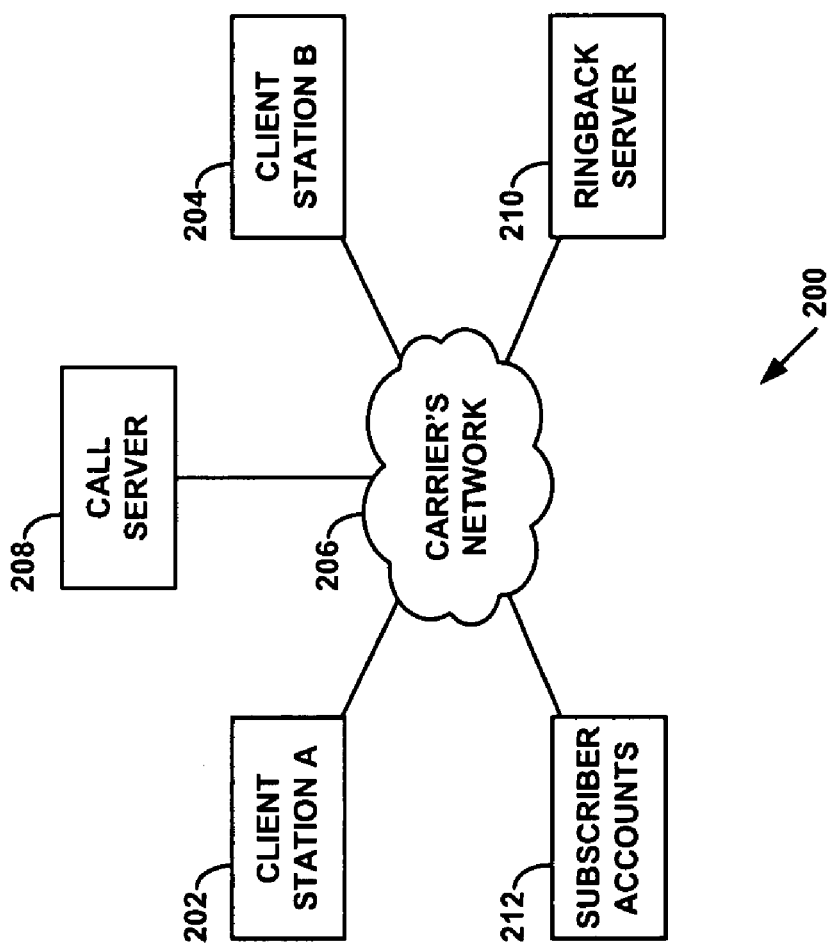
FIG. 2 is a simplified representation of a carrier network in which viral distribution of ringback media can be carried out.

FIG. 2 illustrates a simplified version of an exemplary network 200 that could be owned and operated by a service provider in order to carry out viral distribution of ringback media. Network 200 includes carrier's network 206, which supports communication among representative, connected devices and network elements, namely, client station A 202 and client station B 204, call server 208, ringback server 210, and subscriber accounts 212. It should be understood that other entities and elements, although not shown, could be included network 200.

In exemplary operation of the present invention in the context of FIG. 2, a subscriber, "Subscriber A," at client station A could call another subscriber, "Subscriber B," at client station B. Call server 208 may facilitate call setup for such a call, for example, performing call control and signaling to route the call and to coordinate and/or allocate any necessary network resources, such as bearer channels. During call setup, call server 208 will preferably request from subscriber accounts 212 the subscriber account record of Subscriber B in order to determine how to handle the call, and may thus also determine, according to an indication in the account record, the particular ringback media that should be played out during the ringback period of the call. For the purpose of this illustration, the particular ringback media shall be referred to as "ringback tone N" in order to signify a specific identity from among other possible ringback media selections. Call server 208 may then send client station B an alerting signal and at the same (or nearly the same) time, send a signal to ringback server 210 to transmit ringback tone N to client station A.

In practice, call server 208 may facilitate the establishment of a ringback session between ringback server 210 and client station A. Ringback server 210 may then play out ringback tone N to client station A via the ringback session. Upon playout of ringback tone N, Subscriber A may indicate a desire to acquire the ringback tone, for example by pressing one or more keys of a keypad on client station A. Subscriber A's input will in turn cause client station A to generate and transmit a trigger to ringback server 210, preferably via the ringback session, and possibly via call server 208, or other intermediate switching/routing elements.

Upon receiving the trigger, content server 210 may send a message to subscriber accounts 212 requesting that Subscriber A be granted the right to ringback tone N. Subscriber accounts 212 may then update the subscriber account record of Subscriber A by storing in the record an indication that Subscriber A has acquired the right to ringback tone N. Additionally, subscriber accounts 212 will preferably cause a fee to be charged against Subscriber A's account for acquisition of the right. This may be accomplished by subscriber accounts 212 directly, or through communication with a billing system (not shown), for instance. Thereafter, callers to Subscriber A may be presented with ringback tone N during the ringback period of calls placed to Subscriber A. As described above, callers to Subscriber A may also acquire the right to ringback tone N (or other ringback media) through the same process. Thus as the process is repeated by subscribers in network 200, various ringback media become virally distributed among the subscribers, with one or more fees being charge to subscribers for each acquired right to a ringback media.

As illustrated in FIG. 2, network 200 is a generic representation of certain aspects of the present invention. In practice, however, network 200 could take on various forms. For example, carrier's network 206 could be a circuit-switched telephony network, client stations 202 and 204 could be landline telephones, and call server 208 could be a telephony switch. Alternatively, client stations 202 and 204 could be cellular phones, and call server 208 could be a mobile switching center (MSC). Further, call server 208 could represent multiple devices of the same or different types. For example, call server 208 could represent one or more telephony switches and one or more MSCs. In such an exemplary embodiment, one client station could be a cellular phone and the other a landline phone.

In yet another embodiment, carrier's network 206 could be a packet-switched network, such as an Internet Protocol (IP) network, which supports VoIP calls using a protocol such SIP or H.323. In this embodiment, client stations 202 and 204 could be SIP or H.323 client stations that have wired and/or wireless access to network 206, and call server 208 could be a SIP proxy server or an H.323 gateway. These exemplary forms of network 200 are meant as illustrations, and others are possible.

In all of these and other possible embodiments, the basic operation of the invention is similar, namely, (i) receiving at a ringback server a trigger sent from a calling client station during the setup of a call placed by the client station, (ii) recognizing the trigger as a request from the subscriber associated with the calling client station to acquire the right to the particular ringback media played out to that subscriber during the ringback period of the placed call, (iii) responsively granting the right by storing in the subscriber's account record an indication of the granted right, (iv) charging the subscriber a fee for acquiring the right, and (v) thereafter playing out the particular ringback media associated with the granted right to callers to the subscriber. It should be understood that this summary of the basic operation is exemplary, and that in practice, there may be many variations of the specific steps, as well as of the numbers and types of clients and network entities and elements involved, all within the scope of the present invention.

Figure 3:
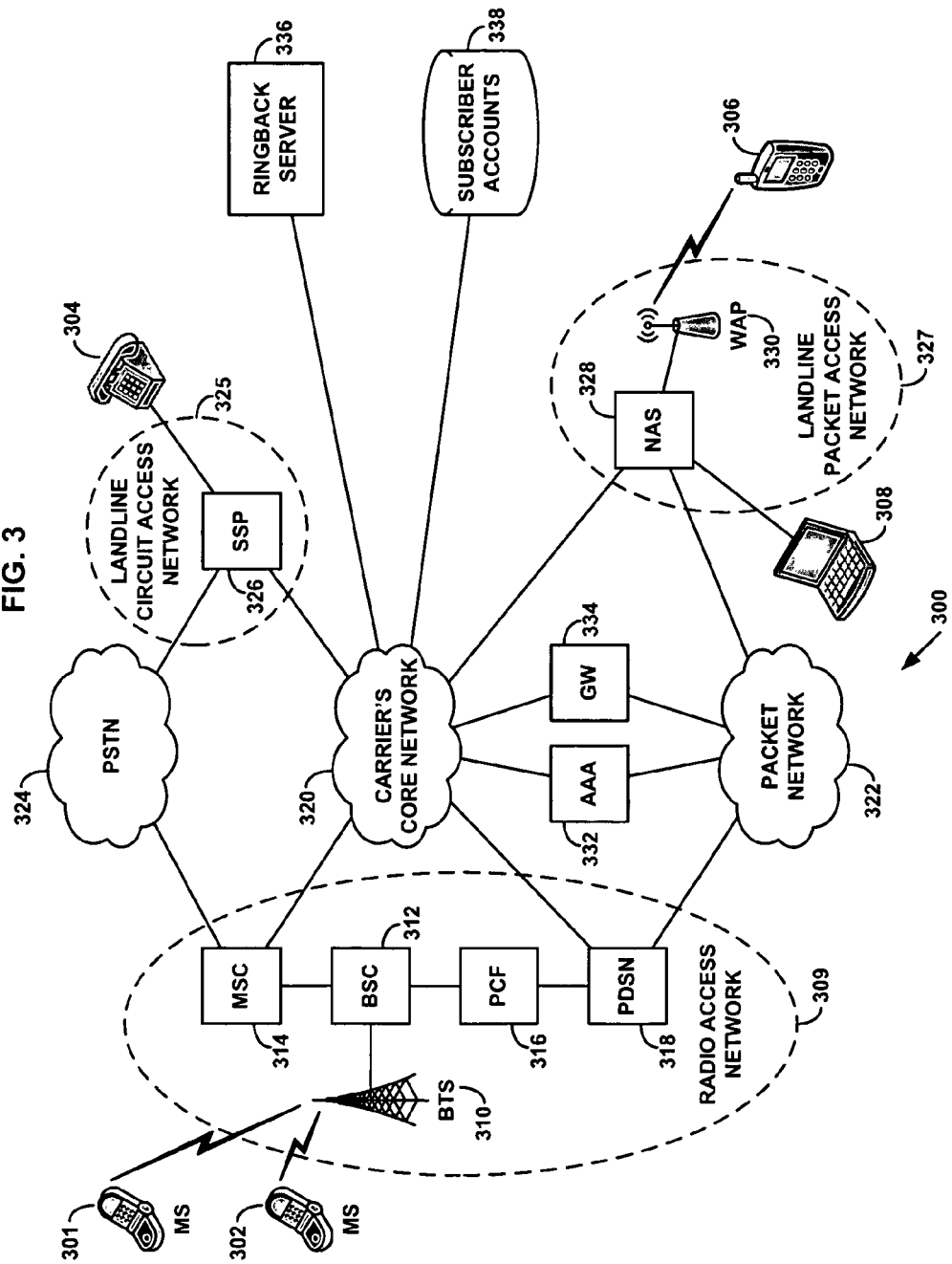
FIG. 3 is an exemplary representation of a carrier network in which viral distribution of ringback media can be carried out.

Further exemplary embodiments of the invention may be understood by considering FIG. 3, which depicts a more detailed representation of a telecommunication network 300 that includes, by way of example, network elements and components suitable for supporting both circuit-based telecommunication services, such cellular and landline voice calls, and packet-based data communication services, such as web browsing, VoIP, and e-mail communication.

Example network 300 includes a carrier's core network 320, which is then connected to one or more access networks/systems, such as a radio access network (RAN) 309, landline circuit access network 325, and landline packet access network 327, each of which may allow subscribers to engage in telecommunication services such as voice telephony and data communications. Each of the access networks is coupled, in turn, with one or more transport networks, such as the public switched telephone network (PSTN) 324 and (either directly or through core network 320, via gateway (GW) 334) a packet network 322. Also connected with the core network 320 is a ringback server 336, and a subscriber accounts database 338, which together with other aspects of network 300 and connected user client stations comprise elements of a preferred embodiment of a system and method for the viral distribution of ringback media, as explained further below.

Core network 320 provides connectivity to various elements, components and entities of network 300, and serves as a transport network for communications among them. Operationally, core network 320 also supports delivery of circuit-based user services and features via signaling and bearer channels, for example, carried over inter-switch digital trunks for regional and long-distance calls. As such, core network 320 may also comprise what is commonly referred to as a backbone network. Core network 320 could be an ATM and/or IP-based network, for example, and could comprise more than one physical and/or logical network and/or sub-network, as well as interconnecting routers and switches. Other transport technologies are possible as well, as are a variety of network topologies and routing/switching protocols and platforms.

In the context of FIG. 3, core network 320 represents at least the communicative coupling of the attached elements shown, as well as other possible entities that are not shown. Note, however, that the exemplary connectivity between network entities provided via core network 320 is not intended to be limiting with respect to other methods or means of communication between any two or more network entities, elements or components. For example, a group of servers and databases that supports a coordinated set of functions, such as billing or subscriber account services, could communicate within an IP sub-network or LAN that is itself connected to core network via a router, or the like. Other arrangements are possible as well.

As noted above, exemplary network 300 also includes packet network 322, which may be a different physical network from core network 320, a separate virtual network overlaid on core network 320, or some combination of both. Other arrangements are possible as well. Packet network 322 provides packet-data transport and services to users and to network servers and other network entities that require packet-data communications. In a preferred embodiment, packet network 322 is an IP network, capable of supporting, for instance, web browsing, VoIP, and other Internet-like services. Although not shown in FIG. 3, packet network 322 may also include various servers for packet-based services, and provide connectivity to other packet networks, for example those of other service providers, or the public Internet.

Subscribers may access features and services of network 300 via one or more client stations, exemplified in FIG. 3 by client access devices 301, 302, 304, 306, and 308. Each illustrates by way of example a different mode and technology of network access, as well as a different form of client station. For example, mobile stations (MSs) 301, 302 represent third-generation (3 G) cellular phones, or the like, that may support both circuit-cellular and packet-data communications using CDMA and/or GPRS/GSM cellular radio access technologies, for instance. Telephone 304 represents a landline telephone, such as one used for circuit-based residential service with a local exchange carrier (LEC). Alternatively, telephone 304 could be a digital PBX phone that accesses the LEC via a PBX switch (not shown), for example. Client station 306 represents a wireless intelligent device, such as a packet-telephony (e.g., VoIP) phone, or the like, with wireless local area network (WLAN) access, such as IEEE 802.11 (also referred to as "wireless Ethernet"), to a packet network. Likewise, client station 308 could be a similar type of intelligent device, but with wired LAN access, such as Ethernet, to a packet network. These example client stations are not meant to be limiting, and other types and/or combinations of devices are possible. For instance, client station 306 could be a personal computer (PC) or workstation having a WLAN interface, and client station 308 could be a wired VoIP phone. Further, MS 301, 302 could incorporate technology for WLAN access as well as cellular radio access to a packet-data network, thus supporting so-called dual-mode capability.

Client stations preferably access network 300 via one or more of the connected access networks, each of which comprises at least one switch, router, or similar entity that includes one or more interfaces to network 300. For example, cellular radio access to network 300 by wireless devices, such as exemplary MS 301 and MS 302, is provided by RAN 309. As illustrated in FIG. 3, RAN 309 comprises base transceiver station (BTS) 310 connected to the network via base station controller (BSC) 312, which in turn is connected both to the circuit-cellular network via MSC 314, and to the packet-data network via packet data serving node (PDSN) 318, by way of packet control function (PCF) 316. PDSN 318 also includes a connection to core network 320.

In typical operation of RAN 309, BTS 310 provides an air interface link to MS 301, 302 (or similar device), while BSC 312 controls BTS 310, for example assigning specific air interface channels and managing mobility of MS 301, 302 across possibly multiple BTSs under its control. For circuit-cellular services, such as circuit-based telephony, communications are then routed between BSC 312 and MSC 314, which in turn provides connectivity to core network 320, to one or more other MSCs or circuit telephony switches (either directly or via core network 320), or to PSTN 324 via digital trunks or similar links to a switch or switches in the PSTN. For packet-data services, such as web browsing and IP multimedia services, communications are instead routed between BSC 312 and packet network 322 via PDSN 318, by way of PCF 316. It should be noted that even though MS 301 and MS 302 are both shown in FIG. 3 to be associated with RAN 309 for illustrative purposes, in practice they need not actually be associated with the same BTS, BSC, MSC, PDSN, or even the same RAN.

The components of RAN 309 illustrated in FIG. 3 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 320 or other interconnecting network, for example. Still further, multiple metropolitan areas, each with a hierarchical arrangement of MSCs, BSCs, and BTSs, or with multiple RANs, for example, could be connected via the carrier's backbone network (e.g., core network 320). Similar arrangements of one-to-many are also possible for PDSNs-to-BSCs as well, as are other configurations. The above examples are not mean to be exhaustive or limiting.

Additionally, each functional element of RAN 309 may be implemented as a separate physical entity, or various combinations of them may be integrated into one or more physical platforms. For example, BTS 310 and BSC 312 may be implemented in a single physical device. Similarly, PCF 316 and PDSN 318 could be combined on a single platform. Other physical configurations of the functional elements of the RAN may also be realized.

Access to landline circuit-based services in network 300, such as conventional circuit-switched telephony, is preferably provided by landline circuit access network 325. Represented in FIG. 3 by a single service switching point (SSP) 326, landline circuit access network 325 typically comprises one or more conventional telephony switches (or similar network entities) at the end office (or offices) of a LEC, for instance, together with interconnecting digital trunks and tandem switches. Similarly to MSC 314, SSP 326 in turn provides connectivity to core network 320, to one or more other SSPs or MSCs (either directly or via core network 320), or to PSTN 324 via digital trunks or similar links to a switch or switches in the PSTN. Access by a device such as telephone 304 to SSP 326 could be via residential local loop, or a digital or analog line to an intervening PBX switch (not shown), for example. Other arrangements are possible as well.

Access to landline packet-data services in network 300, such as web browsing, VoIP, and email communications, is provided by landline packet access network 327. Represented in FIG. 3 by a single network access server (NAS) 328, landline packet access network 327 could comprise a local area network (LAN), such as an enterprise network, a packet-cable distribution system, a cable modem distribution system, a digital subscriber line (DSL) distribution system, or the like, which provides connectivity between landline subscriber stations and NAS 328. In turn, NAS 328, which could comprise one or more routers, DSL switches, cable modem termination systems, or remote-access chassis, for example, provides connectivity to packet network 322, as well as to core network 320. Alternatively or additionally, landline packet access network 327 may comprise a landline telephone system that provides dial-up connectivity between landline subscriber stations utilizing modems, for example, and NAS 328. Intelligent devices such as client station 308 may have wired connectivity, such as Ethernet, to landline packet access network 327. Preferably, landline packet access network 327 also includes one or more wireless access points (WAPs), such WAP 330, to support wireless WLAN access technologies, such as wireless Ethernet (IEEE 802.11), for example, for devices such as wireless client station 306.

Although not shown in FIG. 3, note that other switches may be present in the telecommunication network 300 as well, interconnected by core network 320 or other transport networks, for example. For instance, an inter-exchange carrier (IXC) may provide a switch (e.g., Nortel DMS-250) that serves a connection between LEC switches, MSCs or other regional telecommunication systems, so as to facilitate long distance and other inter-switch calling. As another example, private switches (e.g., PBX servers) might be provided to serve enterprises or other groups of subscribers (e.g., hotels, campuses, etc.) Other examples are possible as well.

Delivery of circuit and packet-data services to subscribers may involve additional network servers, entities, and subsystems which are part of network 300, but which have been omitted from FIG. 3 for the sake of brevity. For example, signaling for setup and management of circuit-based calls and services may be provided by a signaling subsystem/network such as SS7. Thus, while MSC 314 and SSP 326 may comprise certain aspects of an SS7 system, or the like, other elements that make up the system but are not shown could also be connected via core network 320. Similarly, packet-based telephony, such as VoIP, may be supported by network servers SIP proxy servers, or the like, which, although again are not shown, may be connected via packet network 322. Other network-based servers for packet-based services may also be present in network 300.

Exemplary Operation of Viral Distribution of Ringback Media

Viral distribution of ringback media introduced in the Summary above may be carried out in exemplary network 300, and could form the basis of a variety of services that a service provider could then offer to its subscribers according to one or more fee structures, for example. In the following discussion, the term "instant ringback customization service" is used to refer both to the underlying system and method for such trigger-initiated acquisition of rights to ringback media, as well as to a generic designation that a service provider might give to the derived service(s) offered to its subscribers.

In a preferred embodiment, a client station accesses instant ringback customization service using software and/or hardware incorporated for that purpose, while the service is delivered during call setup by ringback server 336 and subscriber accounts database 338, in coordination with other call control and signaling entities of network 300, as described below. Note that, as with other elements shown in FIG. 3, ringback server 336 and subscriber accounts database 338 represent functional elements that could take on various forms in practice. For example, subscriber accounts database 338 could be maintained in association with a signaling control point (SCP) in an SS7 network, or with a home location register (HLR) in a cellular wireless network, for example. Other combinations or configurations are also possible. Further, while ringback server 336 and subscriber accounts database 338 are each shown to be directly connected to core network 320 in FIG. 3, either or both of them could instead be part of a sub-network or LAN, for example comprising a backend services subsystem, which could in turn be connected to core network 320. Alternatively, they could be connected to packet network 322, either individually or, again, as part of some form of service subsystem. Other arrangements are possible as well.

Figure 4:
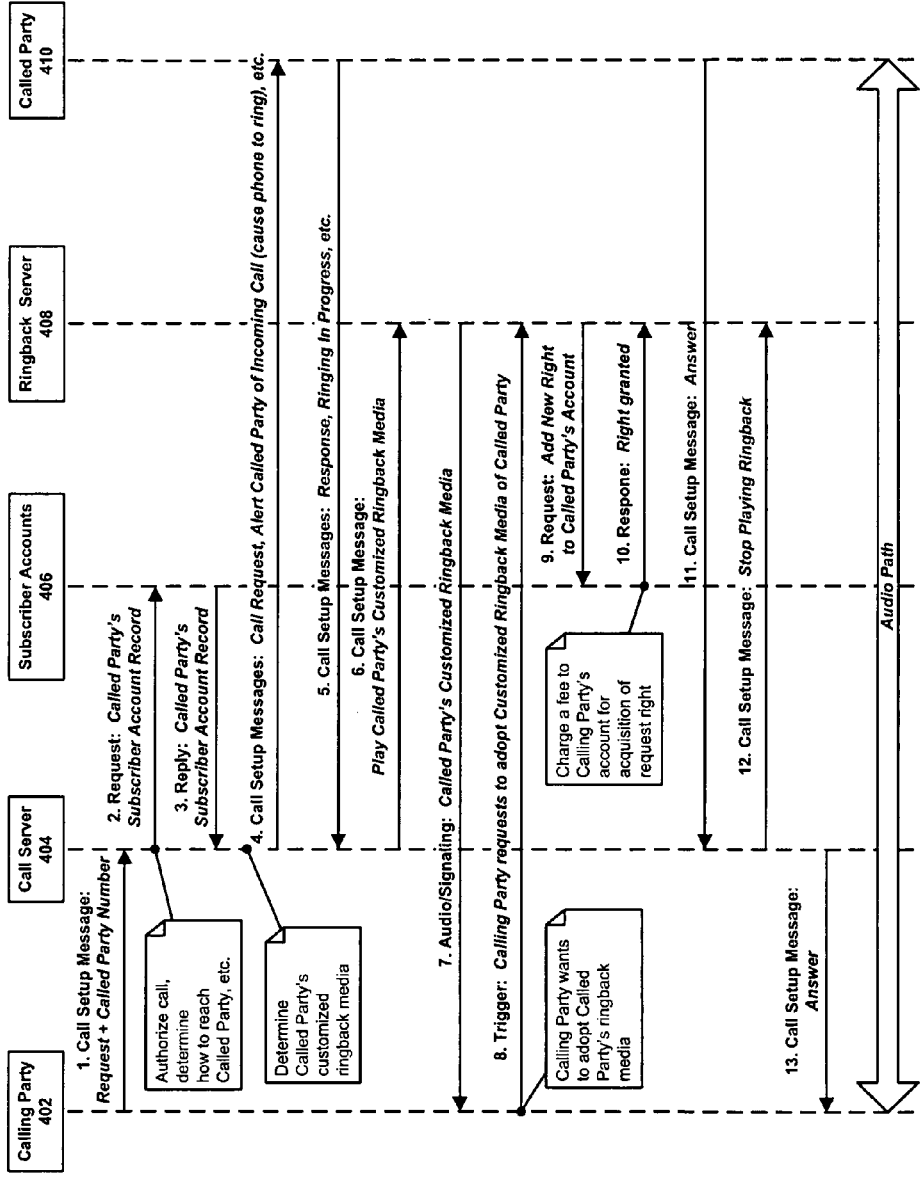
FIG. 4 is an exemplary pseudo-call-flow illustrating the operation of viral distribution of ringback media, with respect to the components and entities involved, and the information that passes between them in the process.

While certain aspects of the instant ringback customization service may vary depending on the type of call being set up (e.g., circuit-based or packet-based), the basic operation is similar for all call types, and can be understood by considering the exemplary pseudo-call-flow illustrated in FIG. 4. In the following explanation of the pseudo-call-flow, it is assumed that both the calling party and the called party are subscribers of the service provider network (e.g., network 300), and that at least the calling client station incorporates the appropriate client-side software and/or hardware.

At step (1), the calling party 402 sends a call request to network call server 404 (such as an MSC or a SIP proxy server) which mediates the call setup. The call request includes the phone number of called party 410, or similar identifier, and possibly the identity of the calling party. Call server 404 authorizes the call, and then determines how to reach called party 410, for example by querying a location server or network registration agent (not shown). At step (2), call server 404 requests the called party's subscriber account record from subscriber accounts 406, a database containing subscriber account and profile information (such as subscriber accounts database 338 in FIG. 3), and then receives the record in a reply at step (3).

The returned subscriber account record may take on a variety of forms of output data format, and may contain various types of information used by call server 404 to process the call, such as authorizations, call-handling preferences possibly conditioned on the identity of the calling party, etc. In addition, the subscriber account record will also contain an indicator that called party 410 has the right to a particular ringback media, possibly as well as associated information indicating conditions under which the particular ringback media should be played out to callers. Conditions could include identity of the caller, time of day, or day of the week, for instance. As in the example above, the particular ringback media in this example is also designated as "ringback tone N" to signify a specific identity among possibly multiple selections of ringback media available to subscribers. Again, this designation is for illustrative purposes only, and other forms of identification of specific ringback media are possible as well. Further, the called party may have acquired the right to ringback tone N (and possibly other, additional ringback media selections as well, as discussed above) through a triggered process, as described above, for example. Alternatively, the called party may have acquired the right via a web-based session with a network server, such as subscriber accounts 338, for instance.

At step (4), call server 404 sends one or more messages to place the call to called party 410, ultimately causing the called party's phone to ring. Assuming the called party's client station is not busy, one or more messages are returned in step (5) including an indication that ringing is in progress. (Note that steps (4) and (5) are meant to represent possibly multiple, interleaved messages and/or transactions, even though they are shown in FIG. 4 as a single arrow in each direction.)

At step (6), call server 404 signals to ringback server 408 (such as ringback server 336 in FIG. 3) to play out ringback tone N (labeled in step (6) and some subsequent steps of FIG. 4 as "Called Party's Customized Ringback Media") to the calling party. For this example call, it is assumed that the particular calling party has previously been identified, in one way or another, by the called party as a caller to whom ringback tone N should be played out. At step (7), ringback tone N is played out by ringback server 408 and received by the calling client station. As noted above, a ringback session between the ringback server and the calling client station is preferably established for the purpose of playing out the ringback media. Thus, steps (6) and (7) may represent possibly multiple, interleaved messages between call server 404, ringback server 408, and calling party 402, that establish the ringback session prior to the actual transmission of the ringback media. Further, the ringback session may traverse one or more network switching/routing elements between ringback server 408 and calling party 402. Such elements could include, without limitation, call server 404, an MSC, PSTN switch, or SIP proxy server, for example.

The playout of ringback media could take on various forms, including audio and/or video streaming on a bearer channel or RTP connection, for instance. Alternatively, the ringback could be transmitted in the form of a packetized data message which is interpreted and played out by the receiving client station. As note, in the case of media playout, it is assumed that a media (e.g., audio and/or video) path between ringback server 408 and calling party 402 will first be established, e.g., by establishing a ringback session (although this step is not explicitly included in FIG. 4).

During the ringback period, the calling party, upon being presented with ringback tone N, may indicate a desire to acquire the ringback media, for example by entering user input on the calling client station. This user input will preferably cause the calling client station to generate and transmit to ringback server 408 a trigger, as illustrated at step (8), and may include information indicating conditions under which ringback tone N should be played out to callers. In accordance with the preferred embodiment, the trigger is transmitted via the ringback session, and may traverse, in the opposite direction, the same intervening network elements as the ringback media. It should be noted, however, that other means of transmission may be possible. For example, the ringback session could be used to play out the ringback media, while the trigger is transmitted out-of-band as a data message, or as an SMS message.

Responsive to receiving the trigger, ringback server 408 at step (9) sends a message to subscriber accounts 406 requesting that the calling party be granted the right to ringback tone N. For instance, ringback server 408 preferably recognizes the trigger as an indication that the calling party desires the right to ringback tone N and responsively sends the request to subscriber accounts 406. Further, ringback server 408 may also identify the user and the particular ringback media desired (ringback tone N in this example) according to identification of the ringback session previously established with the calling party, for example using a session identifier. Alternatively, the trigger itself could contain some or all of this (and possibly other) information.

Upon receipt of the request from ringback server 408, subscriber accounts 406 stores in the calling party's subscriber account record an indication that the requested right to ringback tone N has been granted to the calling, party. Depending possibly upon the contents of the request, subscriber accounts 406 may also store in the subscriber's account record associated information indicating conditions under which ringback tone N should be played out to callers. At step (10), subscriber accounts 406 responds to the request indicating that the request has been granted. Also associated with step (10), subscriber accounts 406 causes a fee to be charged to the calling party, for example by updating a billing record associated with the calling party's account. Note that while steps (9) and (10) are exemplary of carrying out the requesting and granting of the right in the context of a transaction, it should be understood that other message protocols may be used. For example, step (10) could be omitted, while still retaining the action of charging the calling party a fee for acquiring the request right. Other message flows are possible as well. Further, the messages in steps (9) and (10) may traverse call server 404, or other network elements, in their transit between ringback server 408 and subscriber accounts 406.

In an alternative embodiment, or as additional aspect of the present embodiment, the service provider may require subscribers to specifically and explicitly elect instant ringback customization service as an optional add-on account feature in order to be able to participate in the service. In this case, upon receiving the request at step (9), subscriber accounts 406 (or subscriber accounts database 338 in FIG. 3, for example) could first check that the calling subscriber is authorized to be granted the request for the right to ringback tone N (or any other custom ringback media selection), and then grant the requested right only if and when authorization is confirmed. For example, the authorization information could comprise an indication, stored in the subscriber account record, that the subscriber has elected the optional add-on feature of instant ringback customization service. Subscriber accounts 406 would then be able to check the subscriber's authorization (or lack thereof) by examining the same record into which indication of the requested right will be stored upon confirmation of proper authorization. Again, once the right is granted, a per-grant fee may be charged to the subscriber.

In steps (11)-(13), setup of the call from calling party 402 to called party 410 is completed. At step (11), called party 410 signals to call server 404 that the call has been answered. Call server 404 then sends a message to ringback server 408 in step (12) to stop playing ringback media. Note that if ringback media were transmitted in the form of a packetized data message that was interpreted and played out by the receiving client station, the message to stop playing ringback media could instead be sent to the calling client station. At step (13), call server 404 informs calling party 402 that the call has been answered, and the call then proceeds as usual (media path is established).

Once the right to ringback tone N is granted to the subscriber represented in FIG. 4 as calling party 402, subsequent callers to that subscriber may have ringback tone N played out to them during the ringback period. For instance, playout of ringback tone N may be unconditional (i.e., to all callers), or conditioned on the identity of the caller. Further, the conditions may be established as part of the trigger-based procedure, and/or may be set up or modified later by the subscriber within a web-based transaction. Those callers to the subscriber who then are presented with ringback tone N may in turn also request to acquire the right to ringback tone N according to the same or similar steps through which calling party 402 acquired the right. As noted, ringback tone N is an illustrative designation signifying a specific ringback media. It should be understood that the illustrative steps described above could apply to any other specific ringback media that the service provider makes available through instant ringback customization service. Hence, the repeated application of the steps in FIG. 4, or similar steps for the same purpose, leads to viral distribution of the various ringback media involved in each of the repeated applications, as well as to the possible charging of fees by the service provider for the acquisition of the rights to the various ringback media.

The pseudo-call-flow of FIG. 4 corresponds to a generalized description of instant ringback customization service. It should be understood that, for an actual system in practice, different network components may be employed, and specific protocols and messages will be used. Examples include, without limitation, IS-41 and related messages in a circuit-cellular-based system, or SIP and related messages in packet-based VoIP system. Moreover, the steps may vary in order and number depending upon the type of call being placed, as well as the specific implementation within the network context that supports the particular call type. For example, for a circuit-based call, there may be additional steps associated with establishing various legs of the end-to-end bearer channel (circuit). Similarly, for a packet-based call, there may be steps that establish send and receive ports on client stations. There may be other alternative steps, as well. For instance, the subscriber account record request/reply transaction of steps (2) and (3) may instead be an authorization transaction in which the called party's subscriber account record (or a subset of the information in the record) is included in the reply to the call server. Some of these additional details and variations are addressed in relation to specific call types discussed below.

In order to further elaborate the preferred embodiment, instant ringback customization service is described in the following paragraphs by way of example with respect to both circuit-based and packet-based calls, as well as to calls that interconnect circuit-based calls with packet-based calls (using GW 334 or a similar entity to transcode media data and translate signaling protocols, for example). In each of the exemplary call scenarios, a calling party places a call to a called party, wherein, as above, the both the calling party and called party are subscribers in service provider network, and at least the client station of the calling party is assumed to incorporate software and/or hardware for carrying out the described client-side aspects of instant ringback customization service. Again, for illustrative purposes only, the called party is taken to have acquired a right to at least ringback tone N, which represents one of possibly multiple ringback media selections that the service provider makes available to its subscribers as part of instant ringback customization service. Further, it is assumed that the calling party, prior to placing the call, has been identified in the called party's account, in one way or another, as someone to whom ringback tone N should be presented. It should be understood that the call scenarios described below illustrate different exemplary contexts for the invention, and are not intended to limit its scope.

Referring again to FIG. 3, a preferred embodiment of instant ringback customization service may be described in a cellular-circuit-based call in network 300. In such a call, all or part of the bearer channel between the participating client stations comprises time division multiplexed (TDM) digitized media samples carried on a dedicated circuit, such a DS-0. By way of example, a call is placed from a calling party at MS 301 to a called party at MS 302. Without loss of generality with respect to instant ringback customization service, it may be assumed that both MS 301 and MS 302 are associated with the same MSC 314 of the same RAN 309. However, it should be understood that the embodiment does not require the common association, and that the operation described could easily be adapted to a configuration in which the two client stations are associated with different RANs or different elements of the same RAN. Further, MS 301 and MS 302 could switch roles as calling and called client station, respectively, without impacting the embodiment. The call is placed from MS 301 by transmitting a call request with the dialed digits (or other identifier) associated with MS 302 to RAN 309. For a circuit-cellular call, an appropriate air-interface channel and landline bearer channel will be allocated for the call, and the request will be forwarded to MSC 314 via BTS 310 and BSC 312 for further processing.

Upon receipt of the call request, MSC 314 may send an IS-41 LOCREQ message to an HLR (not shown in FIG. 3), for instance, in order to locate MS 302 (in this example assumed to be associated with MSC 314), and may then consult subscriber accounts database 338 (or similar network database) to determine how to handle the call to the subscriber associated with MS 302, including identifying the particular ringback media that should be played out to the caller. Preferably, subscriber accounts database 338 supplies MSC 314 with the called subscriber's account record, which in turn contains an indication that the subscriber has acquired the right to ringback tone N, as well as conditions under which ringback tone N should be played out. Alternatively, subscriber accounts database 338 could be part of the HLR, as noted above, in which case the subscriber account record could be returned in an IS-41 LOCREQ response from the HLR. As a further alternative, the subscriber account record (or similar information) could be returned to MSC 314 as part of a routine call setup transaction (e.g., an authorization step, or other inbound call-handling action), or a transaction related specifically to instant ringback customization service.

Next, MSC 314 routes the call to MS 302. This may involve paging MS 302 in order to wake up the client station and to cause it to request an air interface channel, for example. Details of how this occurs are well-known in the art, and are not discussed further here. Once a bearer channel to MS 302 is established and the called client station acknowledges an alerting signal from MSC 314 by sending a ringing message, for example, MSC 314 then contacts ringback server 336 in order to request that it play out an appropriate ringback tone, in this example ringback tone N, to calling client station MS 301. Preferably, ringback server 336 maintains multiple ringback tones (media) in one or more file formats, such as digital data or audio files, and can selectively play out ringback tones upon request. Thus upon receiving the request from MSC 314, ringback server 336 will play out ringback tone N to calling client station MS 301.

The transmission of the ringback media to MS 301 could take various forms, including, without limitation, audio and/or video playout, DTMF tones, or packetized data. For audio and/or video playout, MSC 314 may also ensure that the ringback server 336 is connected to the bearer channel to MS 301, so that the ringback media will be played out to the caller. Thus, the request/response transaction between MSC 314 and ringback server 336 could preferably take the form of a circuit call setup in order to establish a ringback session between ringback server 336 and MS 301. For instance, MSC 314 could send ringback server 336 an ISUP IAM, and ringback server 336 could respond with an ISUP ACM, followed by an ISUP ANM. Further, the ringback session and the media it carries could traverse one or more network switch elements, such as MSC 314, for example, between ringback server 336 and MS 301.

Alternatively, for ringback media transmission in the form of a packetized data message, MSC 314 could supply ringback server 336 with a contact address or identifier for MS 301, for instance, and ringback server 336 could in turn transmit the packetized data message to MS 301. Ringback media could then be played out by MS 301 according to information in the packetized data message. In this case, as well, the ringback media transmission may traverse one or more network switch elements between ringback server 336 and MS 301.

During the ringback period of the call setup, the calling subscriber may signal a request to acquire rights to ringback tone N by providing some form of user input on MS 301, which in turn causes MS 301 to generate and transmit a trigger to ringback server 336. For example, the calling subscriber may press one or more keypad keys that cause in-band transmission of DTMF tones, e.g., comprising a feature code or other message format. The in-band transmission of the trigger will preferably be carried within the ringback session established for the purpose of playing out ringback media to MS 301, again, possibly by way of one or more intervening network switch elements. Alternatively, the trigger could be transmitted as an out-of-band signaling message, for example using the paging channel, or as an SMS message. In this case, MS 301 preferably includes software operable to generate and transmit the out-of-band message. As described above, the trigger also conveys information indicating the conditions under which ringback tone N should be played out. These exemplary embodiments should not be viewed as limiting.

Upon receiving the trigger from MS 301, ringback server 336 will process the trigger and determine that it corresponds to a subscriber request to acquire the right to a particular ringback media, in this example ringback tone N. Preferably, ringback server 336 will recognize the requesting subscriber and the requested ringback media according to identification information associated with the ringback session in which the trigger was sent. Note that the trigger may additionally or alternatively contain equivalent information, so that ringback server 336 may be able to determine the subscriber and the requested ringback media if the received trigger was not sent in the ringback session.

In accordance with the present embodiment, ringback server 336 will send a message to subscriber accounts database 338 requesting that the calling subscriber be granted the right to ringback tone N, and possibly also indicating conditions under which ringback tone N should be played out. In turn, subscriber accounts database 338 will store in the calling subscriber's account record an indication that the right has been granted, and further cause a fee to be charged against the calling subscriber's account. As described above in connection with the pseudo-call-flow of FIG. 4, subscriber accounts database could first confirm that the calling subscriber is authorized to acquire the right to ringback tone N, and only then grant the right and, possibly, charge a fee to the calling subscriber's account.

Continuing on with the exemplary call setup of the call placed from MS 301 to MS 302, ringback tone N will be played out to MS 301 until the called party answers the call and the called party's client station (MS 302 in this example) sends a corresponding message to MSC 314 (e.g., an ISUP ANM). Note that the call could be answered by a person, an answering machine, or some other call-handling function. When MSC 314 detects the answer message, it will take action to end playout of ringback tone N to MS 301, such as cutting off the audio channel, or directing ringback server 336 (or possibly MS 301) to cease playout of the ringback tone. If the ringback media is sent to MS 301 as a packetized data message and played out by MS 301, MSC 314 may instead direct MS 301 to cease playing the ringback media. At this point, the calling and called party may proceed as usual with the call or media session.

In calls placed to the subscriber associated with MS 301 subsequent to the acquisition of by that subscriber of the right to ringback tone N, the caller(s) may then be presented with ringback tone N. Thus, from the perspective of the subscriber associated with MS 301, the right to ringback tone N will have been acquired simply through the act of placing a call to the subscriber associated with MS 302 and providing user input indicating a desire to acquire the ringback media played out during the ringback period of the call. The exemplary operation described above applies to any calling and called subscribers in a provider network (such as network 300), as well as to any ringback media selections made available by the server provider as part of instant ringback customization service. Further, through repeated application of the described operation on other calls and with any or all (authorized) subscribers, various ringback media may be virally distributed among those subscribers, and, possibly, various fees charged by the service provider for the granting of the rights to the ringback media so distributed.

Exemplary operation of instant ringback customization service in a packet-based call proceeds in a similar manner to that of a circuit-cellular-based call, except that, rather than TDM media transmission, the sequential groupings of media data samples are carried in data packets over a packet-switched network, and the call setup and signaling are performed according to packet-telephony protocols by servers in the packet network. In a preferred embodiment, the packet network is an IP network and calls are supported using well-known VoIP protocols. For example, media data are transmitted using the RTP, and signaling is based on SIP, carried out by SIP-compliant network servers (e.g., SIP proxy servers). Additionally, client stations are SIP enabled (e.g., SIP user agents). In further accordance with the preferred embodiment, ringback server 336 and subscriber accounts database 338 are connected, in one way or another, to packet network 322. Without loss of generality, it may be assumed that they are both IP-based network servers, although other configurations are possible as well. It is even possible that both components are the same as the ones used for circuit-based calls, and that their functionality is shared within network 300 for all call types.

In an exemplary packet-based call, the calling party at cellular wireless client station MS 301 in FIG. 3 places a SIP-based VoIP call to the called party at intelligent client station 306. As above, both the calling party and the called party are taken to be subscribers in the service provider's network, and MS 301 incorporates appropriate client-side software and hardware. Note that MS 301 and intelligent client 306 could switch rolls as calling and called devices, respectively, and further, MS 302 and/or intelligent client 308 could be substituted for either the calling party or called party, respectively, without loss of generality with respect the present embodiment of instant ringback customization service.

In further accordance with the preferred embodiment, MS 301 (or similar cellular wireless device) will first establish a data connection to the IP network (e.g., packet network 322) via PDSN 318. For example, in RAN 309, PDSN 318 may receive an origination message from MS 301 (via BTS 310, BSC 312, and PCF 316), seeking to establish a packet-data session. Upon authentication and authorization of the subscriber via a query to authentication-authorization-accounting (AAA) server 332, PDSN 318 may then grant the request. Exemplary packet data sessions could include a point-to-point protocol (PPP) session between MS 301 (or similar device) and the PDSN 318, and a mobile Internet Protocol (Mobile IP) session between MS 301 and a Mobile IP home agent (not shown in FIG. 3). In response, PDSN 318 may negotiate with the MS 301 to establish a data-link layer connection, and PDSN 318 or a Mobile IP home agent may assign an IP address for the MS 301 to use in communications on the packet network 322. A packet data session is thus established and packet data communications to and from MS 301 may then flow through the PDSN 318 during the session.

With a packet-data session established and an IP address assigned, the subscriber associated with MS 301 may then register its SIP contact information with an appropriate SIP proxy/registrar. The related procedures are well-known in the art, and are not described further here. It is also assumed that the subscriber associated with intelligent client 306 is similarly registered with a SIP proxy/registrar. Note that the two exemplary client stations need not register with the same proxy/registrar.

MS 301 may place a call to intelligent client 306 by sending a SIP INVITE message containing a phone number (or other identifier) of the called party to an originating SIP proxy server in the network. The SIP INVITE message may also contain an IP port number on MS 301 at which inbound media may be directed (i.e., a "listen port"), for example using RTP. The originating SIP proxy server will then consult some form of location service in the network (e.g., a domain name server) to determine contact information for the called party so it can route the call. The proxy server will also consult with subscriber accounts database 338 to determine how to handle the call to the subscriber associated with intelligent client 306, including identifying the particular ringback media that should be played out to the caller. Similarly to the circuit-cellular-based call described above, subscriber accounts database 338 preferably supplies the originating SIP proxy server with the called subscriber's account record, which in turn contains an indication that the subscriber has acquired the right to ringback tone N, possibly as well as conditions under which ringback tone N should be played out. Again, the subscriber account record may be supplied as part of a general authorization transaction during call setup. The originating proxy server will then forward the SIP INVITE to intelligent client 306, possibly by way of one or more other, intervening proxy servers, including a terminating one that serves client 306.

Upon receiving the SIP INVITE, intelligent client station 306 may then respond with a SIP 180 RINGING message, which will be routed back toward MS 301, by way of the originating proxy server. The originating SIP proxy server will respond to the SIP 180 RINGING message by sending a message to ringback server 336 requesting it to play out ringback tone N to MS 301. For instance, for in-band playout, the originating SIP proxy server may first mediate the establishment of a ringback session between ringback server 336 and MS 301. Thus, the originating SIP proxy server may send to ringback server 336 a SIP INVITE message containing the listen port on MS 301, in order to set up a media-based ringback session to MS 301 for the purpose of playing out ringback tone N to MS 301. Note that the media carried within the ringback session could traverse one or more network switching/routing elements, such as packet routers. Alternatively, the ringback media could be sent by ringback server 336 to MS 301 in a signaling message, out of band from the media stream. In this case, MS 301 preferably would process the signaling message and play out ringback tone N. Other arrangements are possible as well.

As with the circuit-cellular-based call described above, the calling subscriber may signal a request to acquire the right to ringback tone N by providing some form of user input on MS 301, which in turn causes MS 301 to generate and transmit a trigger to ringback server 336. Preferably, for the exemplary SIP-based call, the trigger would be transmitted in a SIP message, such as a SIP NOTIFY message. Alternatively, the SIP message could be transmitted to the originating SIP proxy server, which could then communicate with ringback server 336. As yet a further alternative, the trigger could be transmitted in-band, for example as DTMF tones (e.g., corresponding to a feature code), within the ringback session established for the purpose of playing out ringback media to MS 301. Again, the trigger could also convey information indicating the conditions under which ringback tone N should be played out. These exemplary embodiments should not be viewed as limiting.

Upon receiving the trigger from MS 301, ringback server 336 will, as described above, process the trigger and determine that it corresponds to a subscriber request to acquire the right to a particular ringback media, in this example ringback tone N. In accordance with the present exemplary operation, ringback server 336 will recognize the requesting subscriber and the requested ringback media according to identification information in the SIP message that carried the trigger. Alternatively, for in-band trigger transmission, ringback server 336 could determine this information through identification with the ringback session in which the trigger was sent.

Again, as described above in the context of the exemplary circuit-cellular-based call, ringback server 336 will send a message to subscriber accounts database 338 requesting that the calling subscriber be granted the right to ringback tone N, possibly as well as the conditions under which ringback tone N should be played out. Subscriber accounts database 338 will then store in the calling subscriber's account record an indication that the right has been granted, and cause a fee to be charged against the calling subscriber's account. And again, subscriber accounts database could first confirm that the calling subscriber is authorized to acquire the right to ringback tone N, and only then grant the right and, possibly, charge a fee to the calling subscriber's account.

Continuing on with the exemplary call setup of the call placed from MS 301 to intelligent client station 306, ringback will continue until the called party answers the call, signaled by a SIP 200 OK message from intelligent client 306 sent back to MS 301 by way of the originating proxy server. The originating proxy server may then cause ringback server 336 to cease playing (or otherwise transmitting) ringback media. Again, if the ringback media was transmitted in signaling message to MS 301, then the originating SIP proxy may send a SIP message to MS 301 to cause it to stop playing ringback media (ringback tone N in this example). The call session between the calling and called party may then proceed as usual.

The result of the subscriber associated with MS 301 having acquired the right to ringback tone N during the setup of the exemplary SIP-based VoIP call is the same as that described above for the exemplary circuit-cellular-based call. Namely, callers to that subscriber may be presented with ringback tone N. Again, from the perspective of the subscriber associated with MS 301, the right to ringback tone N will have been acquired simply through the act of placing a call to another subscriber, in this example the subscriber associated with intelligent client station 306, and providing user input indicating a desire to acquire the ringback media played out during the ringback period of the call. Also in similarity with the exemplary circuit-cellular-based call, the operation described with respect to the exemplary SIP-based VoIP call applies to any calling and called subscribers in a provider network (such as network 300), as well as to any ringback media selections made available by the server provider as part of instant ringback customization service. And again, through repeated application of the described operation of SIP-based VoIP calls involving any or all (authorized) subscribers, various ringback media may be virally distributed among those subscribers, and, possibly, various fees charged by the service provider for the granting of the rights to the ringback media so distributed.

Operation of instant ringback customization service may also be carried out in the preferred embodiment for a call that interconnects a packet-based call with a circuit-based call. In this case, all of the aspects described above apply to the mixed-mode call, and one or more network gateway device, such as GW 334, may be used to translate different signaling protocols and transcode different media transport protocols. For example, a SIP device may originate a call to a circuit-cellular phone, or vice versa. In either case, GW 334 may include both a signaling gateway function to translate between SIP and ISUP, and a media gateway function to transcode between the respective encoding protocols (i.e., codecs) applied to RTP streams and TDM samples. Alternatively, GW 443 may be representative of separate signaling gateways and media gateways. Other translations and transcodings are possible as well. These functions and methods are well-known in the art, and not described further here. Each device in such a call would communicate with the network as described above for the respective types of calls, and the subscriber associated with the calling client station would ultimately acquire the right to the ringback media played out to the calling client station during the setup of a call in which the subscriber requested the right.

Exemplary Client Station and Network Server Device

Figure 5:
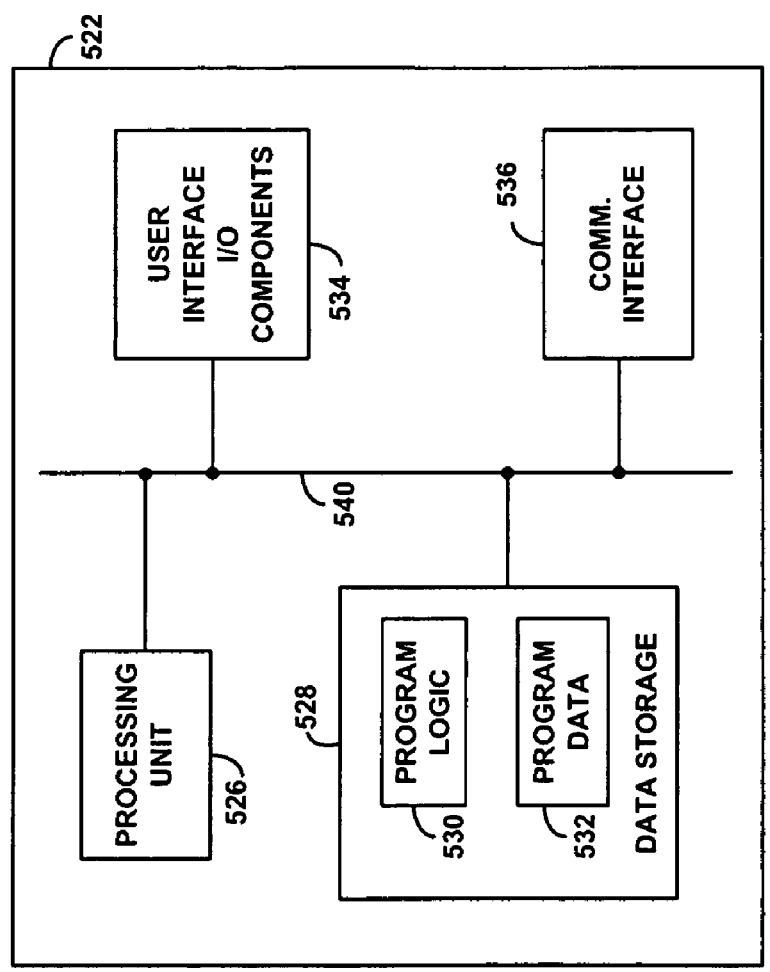
FIG. 5 is an exemplary illustration of the functional architecture of a client station.

FIG. 5 is a simplified block diagram depicting functional components of an example user communication device (UCD) 522 that may be arranged to generate and transmit a trigger to a ringback server during the setup of a call placed by the device. The example UCD 522, representative of MS 301, 302, or intelligent clients 306, 308, for example, could be a cell phone, a personal digital assistant (PDA), a pager, a wired or wirelessly-equipped notebook computer, or any other sort of device. As shown in FIG. 5, the example UCD 522 includes user-interface I/O components 534, a communication interface 536, a processing unit 526, and data storage 528, all of which may be coupled together by a system bus 540 or other mechanism.

The user-interface I/O components 534 of the UCD are the parts of the device that interface directly with a user, i.e., the components that receive input from a user and/or provide output to a user. These may include, but are not limited to, a microphone for audio input, a speaker for audio output, an LCD display for visual output, and a keypad for alpha-numeric input. In accordance with a preferred embodiment, user input could include, without limitation, a user request to acquire the right to ringback media played out to the user during setup of a call placed by the user. The detailed arrangement and operation of these and other user-interface I/O components are well known in the art and therefore will not be described in detail here.

Communication interface 536 enables communication with a network, such as network 300 in FIG. 3, via one or more access networks, such as RAN 309 or landline packet access network 327, for example. As such, for access via RAN 309, for example, communication interface 536 may include a module, such as an MSM™-series chipset made by Qualcomm Inc. of San Diego, Calif., and an antenna. Further, communication interface 536 preferably supports wireless packet-data communications according to a well known standard such as cdma2000®. Alternatively or additionally, for access via landline packet access network 327, for example, communication interface 536 preferably supports other air interface protocols, including those for wireless local area network access, such as wireless Ethernet (IEEE 802.11) and WiMax, for example. Still further, for access via landline packet access network 327, for example, communication interface 536 could support wired access, such as Ethernet.

Processing unit 526 comprises one or more general-purpose processors (e.g., INTEL microprocessors) and/or one or more special-purpose processors (e.g., dedicated digital signal processor, application specific integrated circuit, etc.). In turn, the data storage 528 comprises one or more volatile and/or non-volatile storage components, such as magnetic or optical memory or disk storage. Data storage 528 can be integrated in whole or in part with processing unit 526, as cache memory for instance. In the exemplary embodiment, as shown, data storage 528 is configured to hold both program logic 530 and program data 532.

Program logic 530 preferably comprises machine language instructions that define routines executable by processing unit 526 to carry out various functions described herein. By way of example, with UCD 522 representing MS 301, the program logic may be executable to communicate with communication interface 526 in order to set up a circuit-based phone call via MSC 314 by way of BTS 310 and BSC 312, or to establish a packet data session via PDSN 318 by way of BTS 310, BSC 312, and PCF 316. As another example, the program logic and communication interface may operate cooperatively to carry out trigger-initiated acquisition of the right to ringback media played out by ringback server 336 to MS 301.

Without loss of generality, exemplary operation of UCD 522 may be illustrated by taking UCD 522 to represent a wireless cellular phone, such as MS 301, associated with a subscriber in a service provider network (e.g., network 300 in FIG. 3), and considering a wireless-cellular call placed from the wireless cellular phone to an other subscriber in the network. It should be understood that aspects of operation specific to placement of a wireless circuit-cellular call could easily be adapted to a packet-based call using a wireless packet data connection, or WLAN or wired Ethernet access, as described above, for example. In the follow description, it is understood that all communications to/from the network are via communication interface 536.

According to a preferred embodiment, a user will typically place the call via keypad input in user-interface I/O components 534, and the call will proceed as described above. During the ringback period, the calling subscriber may, by pressing one or more keys on the keypad, indicate a desire to acquire the particular ringback media being played out by ringback server 336 to UCD 522, for example. This action will preferably cause corresponding DTMF tones to be transmitted to ringback server 336. Alternatively, the user input could cause processing unit 526 to execute instructions from program logic 530 that preferably generate a trigger and cause it to be transmitted, via communication interface 536, to ringback server 336. As described above, the trigger may include information that identifies the user and the particular ringback media to which the right is being requested, and may also contain information that indicates the conditions under which the particular ringback media should be played out.

Upon receiving the trigger at the ringback server, the remaining actions associated with instant ringback customization service are carried out by network elements, as described above. Note that other aspects of operation of UCD 522 related to call setup and call activity, such as signaling, bearer-channel processing, and media encoding and decoding, have been omitted for the sake of brevity. These operational aspects are well-known in the art and not considered further here.

Figure 6:
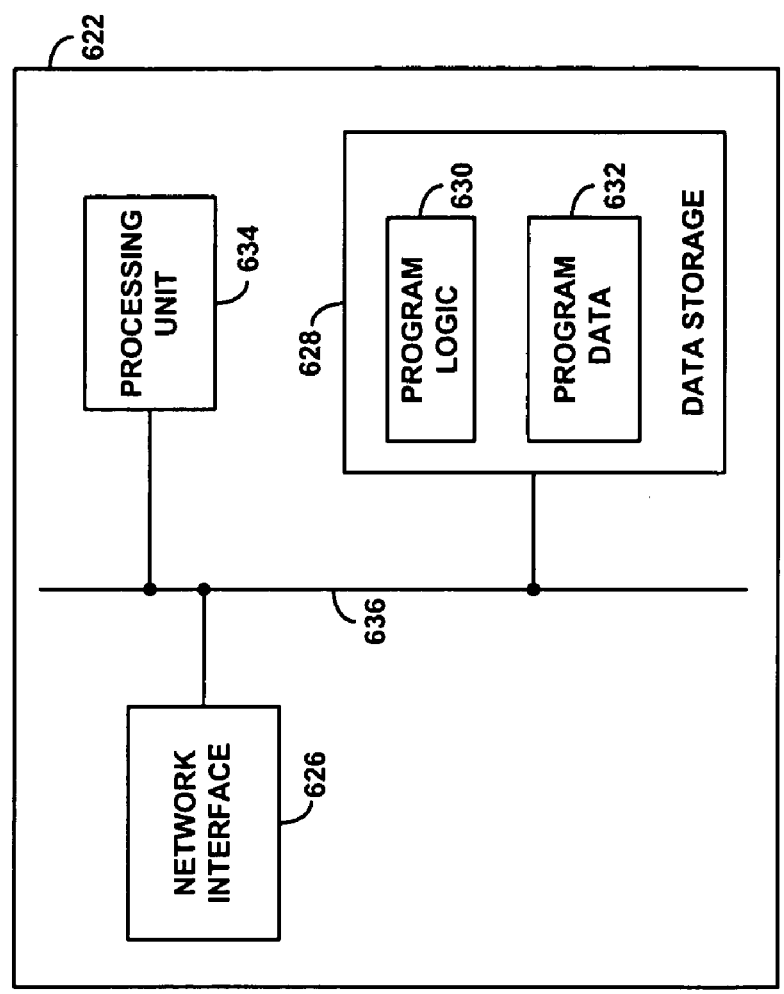
FIG. 6 is an exemplary illustration of the functional architecture of a ringback server.

FIG. 6 is a simplified block diagram depicting functional components of an example ringback server 622 arranged to carry out its functions. As shown in FIG. 6, the example ringback server 622, representative of ringback server 336 FIG. 3, for example, includes a network interface 626, a processing unit 634, and data storage 628, all of which may be coupled together by a system bus 636 or other mechanism. In addition, the ringback server may also include external storage, such as magnetic or optical disk storage, although this is not shown in FIG. 6.

Network interface 626 enables communication on a network, such as a packet network. As such, network interface 626 may take the form of an Ethernet network interface card that can be coupled with a router or switch to a network such as core network 320, for example, or connected to a subnet, which in turn is couple to core network 320. By way of example, the subnet could be a LAN that interconnects components that comprise a service-delivery subsystem. Example components could include external disk storage for content in the form of data files, and an operator interface for provisioning the subsystem. Alternatively, network interface 626 may take other forms, providing for wired and/or wireless communication on a network or a subnet.

Processing unit 634 comprises one or more general purpose processors and/or one or more special purpose processors. And data storage 628 comprises one or more volatile and/or non-volatile storage components, which can be integrated in whole or in part with processing unit 634. As further shown, data storage 628 is equipped to hold program logic 630 and program data 632.

Program logic 630 preferably comprises machine language instructions that are executable by processing unit 634 to carry out various functions described herein. By way of example, the program logic 630 may be executable by processing unit 634 to receive a request from a network call server element, such as an MSC or a SIP proxy server, and responsively establish a ringback session to a client station indicated in the request, and play out in the ringback session a particular ringback media, also indicated in the request. As a further example, the program logic 630 may be executable by processing unit 634 to receive during the playout of a particular ringback media to a client station, such as MS 301, a trigger from the client station, and to responsively cause the granting of the right to the particular ringback media to the subscriber associated with the client station.

According to a preferred embodiment, a request from a network call server element, such as an MSC or a SIP proxy server, to play out a particular ringback media to a calling client station will arrive at network interface 626. A program executing according to instructions from program logic 630 in processing unit 634 may then analyze and process the request, and responsively retrieve the requested ringback media from program data 632, or possibly from external disk storage (not shown), or the like, via network interface 626. The actions of the program may also include establishing a ringback session with the calling client station for the purpose of playing out the particular ringback media.

In further accordance with the preferred embodiment, a trigger from the calling client station, such as an MS 301 or intelligent client station 306, will arrive at network interface 626. A program executing according to instructions from program logic 630 in processing unit 634 may then analyze and process the trigger, and determine that the trigger corresponds to a request by the subscriber associated with the calling client station to acquire the right to the particular ringback media being played out to the calling client station in a ringback session with that station. The program may then act to generate and transmit a request to subscriber accounts database 338 to grant the right to a particular ringback media to the subscriber associated with the calling client station. Further, a response to the request may be transmitted from subscriber accounts database 338 and subsequently arrive at network interface 626.

One skilled in the art will recognize that the operation of ringback server 622 with respect to receiving and processing the request for playout of ringback media, receiving and processing the trigger from the calling client device, as well as the subsequent communication with the subscriber accounts database 338, could be put into practice in numerous ways.

Additional aspects of operation of ringback server 622 may include operator provisioning to enable the storage of specific ringback media, for example. Operator provisioning could be carried out using a web-based user interface from an external computer workstation (not shown) connected to ringback server 622 via network interface 626, for instance. Other means for operator provisioning are be possible. Further, there may be additional and/or alternative aspects of operation of ringback server 622 for manipulating the stored ringback media and/or other content.

Although the block diagram of in FIG. 6 as described applies to operation of a ringback server, the same block diagram, but with slightly different interpretation of block functions, may be applied to the operation of a subscriber accounts database, such as subscriber accounts database 338 in FIG. 3. As with the ringback server, external disk storage, or the like, may be associated with the subscriber accounts database. In the case of a subscriber accounts database, the program logic executed by the processing unit preferably implements the operations of the subscriber accounts database 338 as described above in connection with instant ringback customization service, for example. Additionally, the network interface may be used for communication with a ringback server, such as a ringback server 336, in order to receive a request to grant the right to a particular ringback media selection to a given subscriber (whose account record is stored in the subscriber accounts database). Also as with the ringback server, provisioning (via the network interface) may be used to manipulate the stored subscriber records, for example. Further, the provisioning interface may support some form of subscriber input in order to enable subscriber customization of ringback media, for instance. Again, one skilled in the art will recognize that the operation of the subscriber accounts database with respect to instant ringback customization service could be put into practice in numerous ways.

CONCLUSION

An exemplary embodiment of the present invention has been described above. Those skilled in the art will understand, however, that changes and modifications may be made to the embodiment described without departing from the true scope and spirit of the invention, which is defined by the claims.

We claim:

1. A method of virally distributing ringback media comprising:
    during playout of ringback media to a subscriber while setting up a call placed by the subscriber to a given subscriber that has a right to have the ringback media played out to callers to the given subscriber, receiving a trigger from the subscriber;
    responsive to the trigger, granting the right to the subscriber to have the ringback media played out to callers to the subscriber;
    after granting the right to the subscriber, playing out the ringback media to a caller to the subscriber;
    during playout of the ringback media to the caller to the subscriber, receiving a trigger from the caller, and responsively granting the caller the right to have the ringback media played out to others.

2. The method of claim 1, wherein granting the right to the subscriber to have the ringback media played out to callers to the subscriber comprises:
    recording in an account record of the subscriber an indication that the subscriber has the right to have the ringback media played out to callers to the subscriber.

3. The method of claim 1, further comprising:
    charging an account of the subscriber for acquisition of the right.

4. The method of claim 1, wherein receiving the trigger comprises receiving the trigger at a ringback server that is playing the ringback media to the subscriber.

5. The method of claim 1, wherein receiving the trigger comprises receiving at least one tone dialed by the subscriber.

6. The method of claim 1, wherein playout of the ringback media to the subscriber occurs through a session between a ringback server and the subscriber, via at least one switch, and wherein receiving the trigger comprises:
    receiving, at the switch, a signaling message transmitted from the subscriber; and
    receiving at the ringback server, a corresponding signaling message transmitted from the switch in response to the signaling message received at the switch.

7. A method of virally distributing ringback media comprising:
    maintaining, in an account record for a first subscriber, an indication of ringback media to which the first subscriber has acquired a right to have played out to callers to the first subscriber;
    playing out the ringback media from a ringback server to a second subscriber during setup of a call from the second subscriber to the first subscriber;
    receiving from the second subscriber a trigger provided by the second subscriber during the playout of the ringback media to the second subscriber;
    responsive to the trigger received from the second subscriber, storing in an account record for the second subscriber an indication that the second subscriber has acquired a right to have the ringback media played out to callers to the second subscriber;
    playing out the ringback media from the ringback server to a third subscriber during setup of a call from the third subscriber to the second subscriber;
    receiving from the third subscriber a trigger provided by the third subscriber during the playout of the ringback media to the third subscriber; and
    responsive to the trigger received from the third subscriber, storing in an account record for the third subscriber an indication that the third subscriber has acquired a right to have the ringback media played out to callers of the second subscriber.

8. The method of claim 7, further comprising:
    receiving from the first subscriber a request to have the ringback media be played out to at least the second subscriber, and responsively storing in the account record for the first subscriber an indication that the ringback media should be played out to at least the second subscriber,
    wherein playing out the ringback media from a ringback server to the second subscriber during setup of the call from the second subscriber to the first subscriber occurs in accordance with the indication that the ringback media should be played out to at least the second subscriber.

9. The method of claim 7, further comprising:
    charging an account of the second subscriber for acquisition of the right to have the ringback media played out to the callers to the second subscriber.

10. The method of claim 7, further comprising:
    establishing a ringback session between the ringback server and the second subscriber during setup of the call from the second subscriber to the first subscriber,
    wherein playing out the ringback media from a ringback server to the second subscriber comprises playing out the ringback media in the ringback session.

11. The method of claim 10, wherein receiving the trigger from the second subscriber comprises receiving the trigger in the ringback session.

12. The method of claim 11, wherein the ringback session passes between the ringback server and the second subscriber via at least one switch, and wherein receiving the trigger from the second subscriber comprises:

receiving, at the switch, a signaling message transmitted from the second subscriber; and receiving at the ringback server, a corresponding signaling message transmitted from the switch in response to the signaling message received at the switch.

13. The method of claim 7, wherein receiving the trigger from the second subscriber comprises receiving a message transmitted via short messaging service (SMS) from the second subscriber.

14. The method of claim 7, wherein receiving the trigger from the second subscriber comprises the ringback server receiving the trigger.

15. The method of claim 7, wherein receiving the trigger from the second subscriber comprises receiving a feature code dialed by the second subscriber.

16. The method of claim 7, further comprising:

receiving from the second subscriber a request to have the ringback media be played out to at least the third subscriber, and responsively storing in the account record for the second subscriber an indication that the ringback media should be played out to at least the third subscriber, wherein playing out the ringback media from a ringback server to the third subscriber during setup of the call from the third subscriber to the second subscriber occurs in accordance with the indication that the ringback media should be played out to at least the third subscriber.

17. The method of claim 7, further comprising:

charging an account of the third subscriber for acquisition of the right to have the ringback media played out to the callers to the third subscriber.

* * * * *